United States Patent

[11] 3,588,896

| [72] | Inventor | Robert T. Duarte<br>Reeds Ferry, N.H. |
|---|---|---|
| [21] | Appl. No. | 852,756 |
| [22] | Filed | Aug. 25, 1969 |
| [45] | Patented | June 28, 1971 |
| [73] | Assignee | The United States of America as represented by the Secretary of the Navy |

[54] RADAR COMPOSITE VIDEO PROCESSOR
7 Claims, 2 Drawing Figs.

[52] U.S. Cl........................................................ 343/5,
    343/17.1
[51] Int. Cl........................................................ G01s 7/30,
    G01s 9/02
[50] Field of Search............................................ 343/5 (PR),
    5, 17.1, 17.1 (PRF)

[56] References Cited
UNITED STATES PATENTS

| 3,281,839 | 10/1966 | Triest et al..................... | 343/5X |
| 3,444,553 | 5/1969 | Tsumura et al............... | 343/5 |

*Primary Examiner*—Richard A. Farley
*Assistant Examiner*—Malcolm F. Hubler
*Attorneys*—E. J. Brower, A. W. Collins and S. J. Bor ABSTRACT: A system for combining a plurality of informational radar signals into a single composite signal which is then recorded on one channel of a magnetic tape. The original signals are then reconstructed from the composite signal and applied to a radar display scope which renders a presentation identical to that of the original video signal.

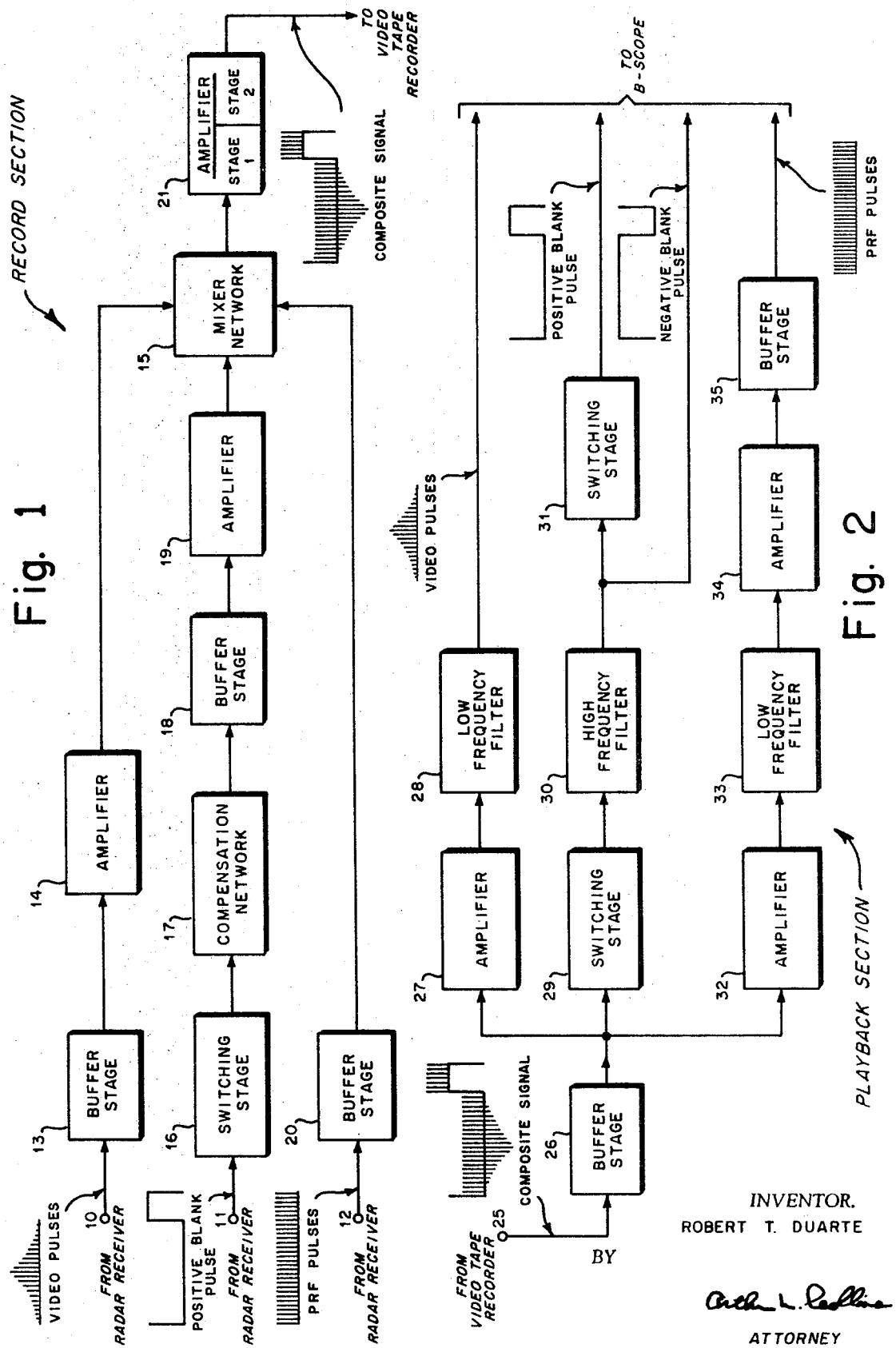

RADAR COMPOSITE VIDEO PROCESSOR

The present invention relates to a radar display system and more particularly to a radar composite video processor which makes possible the recording and playback on a single video track of a magnetic tape, all the necessary data to directly render the presentation of a video signal on a radar B-scope.

In a typical contemporary radar system, at least four individual signals are required to operate an associated B-scope display. These are the pulse recurrence frequency (PRF), positive and negative blank pulses and, of course, the video pulse. At present, there are two unsatisfactory methods being used to obtain a record of the necessary information so that it may be viewed at a later time. Probably the most widely used procedure is to take closed circuit television movies or video tapes of the actual B-scope display and then play these back on a conventional television monitor. The above method has proven to be too expensive and inconvenient in that a television camera and monitor are required to be installed at the radar installation along with the necessary special lighting therefore. In addition, the actual radar B-scope cannot be operated for a simulated display run and the accompanying playback is unrealistic in that the final display is of a different size and type than the original radar scope. An alternative method which is sometimes employed is to record the respective radar pulses on a quadraplex recording system. However, the usefulness of this type of system is lessened considerably due to its excessive initial cost.

According to the present invention, the record section of the composite video processor is capable of accepting the PRF, positive blank and video pulses from the radar receiver and mixing them into a composite video waveform so as to allow it to be recorded on a magnetic tape recorder, for example, such as on the video track of a suitable video tape recorder. By only employing the single video track for information purposes, the two remaining audio tracks of the conventional recorder are free for the utilization of additional annotation and timing signals. Subsequently, the playback stage of the video processor will then accept the composite signal from the recorder and separate it into its original pulses and in addition, create the additional negative blank pulse necessary for proper operation of the B-scope display. These pulses are all provided at the required levels for direct connection to the radar system's associated B-scope, and will render a raster and target video without any apparent degradation from the original unrecorded display.

Accordingly, it is therefore an object of the present invention to provide a novel and improved radar composite video processor which provides direct B-scope playback from prerecorded magnetic tape.

It is a further object of the present invention to provide a simple and efficient video tape recording and playback system which uses the existing radar display devices for subsequent realistic presentation.

It is another object of the present invention to provide novel and improved apparatus for combining radar data pulses into a single composite signal and subsequently reconstructing the original pulses from the composite after it has been recorded.

Other objects, advantages and novel features of the invention will become apparent from the following detailed description of the invention when considered in conjunction with the accompanying drawing wherein:

FIG. 1 of the drawing is a schematic block diagram showing a preferred embodiment of apparatus for carrying out the record function of the present invention; and FIG. 2 of the drawing is a schematic block diagram showing a preferred embodiment of apparatus for carrying out the playback function of the present invention.

Referring now to the drawing, the block diagram of FIG. 1 represents the basic components of the record or mixer section of the radar composite video processor. The record section includes a trio of input terminals 10, 11 and 12 which receive the video pulses, the positive blank pulses and the PRF pulses, respectively, as they are produced by the radar receiver being monitored. The radar video pulses, which are the information signals finally producing a visible image on the B-scope, are applied through the terminal 10 to the buffer stage 13 which is provided to prevent any adverse interaction between this portion of the record section and the radar receiver. The buffer stage 13 may be any type of extremely stable amplifier whose operation is in its linear region, for example, buffer 13 is preferably a semiconductor emitter-follower circuit configuration. The output from the buffer stage 13 is then connected to an amplifier stage 14, which is preferably operated over a linear portion of its characteristic, for example, such as in Class A operation, wherein the output is amplified and inverted in phase and then applied to the mixer network 15, whose operation will become more apparent hereinafter.

The input terminal 11 receives the positive blank pulse from the radar receiver where it is coupled to a switching stage 16 which inverts the pulse and eliminates any pulse distortion caused by the AC coupling from the radar receiver. The inverted output from the switching stage 16 is fed to a compensation network 17 which is preferably a substantially long time-constant integrator circuit that causes the square blank pulse to rise from its leading to its trailing edge. This compensation is provided to eliminate the inherent tilt or droop in the blank pulse resulting from the magnetic tape recorders inability to pass the DC component without differentiating it. Thus, the elements comprising the compensation network 17 are chosen to produce a square positive blank pulse at the output of the tape recorder, or to the input to the playback section of the composite video processor, whose operation will become more apparent hereinafter. The integrated output from the compensation network 17 is fed to a buffer stage amplifier 18, also preferably having an emitter-follower configuration, the output of which then drives an amplifier 19 which amplifies and inverts the negative pulse before it is fed to the mixer network 15.

The PRF pulses from the radar receiver are applied through the input terminal 12 to the buffer stage 20 to prevent interaction between the radar receiver and the record section. The output from the buffer stage 20, which is preferably an emitter-follower semiconductor circuit, is connected to the mixer network 15 which combines the three signals into a single composite signal which has the positive blank and PRF pulses and the negative video pulses superimposed on it.

The composite signal from the mixer network 15 is then fed to the amplifier pair 21 which is preferably a two-stage compound connected amplifier in the common-emitter configuration, for example, such as a Darlington connected pair of transistors which offers extremely low distortion with excellent stability. The output from the amplifier pair 21 is connected to the video input circuit of a video tape recorder which records the composite signal on its video track. It is to be noted that this composite signal has all the information necessary to later operate the radar B-scope display.

Once the composite video signal is recorded and it is desired to view the results, it is necessary to take the composite video signal from the output of the tape recorder and separate the signal into its original signals, the positive blank, PRF and video pulses. Additionally, it is necessary to create a negative blank pulse from the positive blank pulse as the B-scope requires both for a proper functioning display.

Referring now to the playback or separator section of the composite video processor shown in FIG. 2, the composite signal from the video tape recorder is applied to the input terminal 25 and fed to the buffer stage amplifier 26, which is necessary to isolate the output circuitry of the tape recorder from the elements of the playback section. The output from the buffer stage 26 is supplied separately to each of three separate circuits for processing into the necessary operational signals.

The first output from the buffer stage 26 is coupled to the amplifier 27 which is operating at a saturation point for all levels of the composite signal except for the inverted video pulse portion thereof. The video pulses applied to the amplifier 27 are sufficiently negative to bring it out of saturation and permit amplification of the video pulses only. The amplifier 27, which is preferably a transistorized amplifier stage, is biased so that none of the positive blank pulses nor the PRF pulses are amplified and passed, but only the video portion of the composite signal is properly amplified and inverted in phase with no loss or clipping. The output from the amplifier 27 is coupled through a low frequency filter 28 to remove any level shifts on the output due to the lower frequency positive blank component of the composite signal before it is applied to the radar B-scope for display.

The second output from the buffer stage 26 is applied to the switching stage 29 which operates to invert the composite signal. The output from the switching stage 29 is passed through a high frequency filter 30 to remove the video and PRF pulses present in the signal before it is applied to the B-scope as the negative blank pulse. The output from the filter 30, in addition to being applied to the B-scope directly, is also fed to a second switching stage 31 which inverts the negative pulse whereupon the output therefrom is applied to the B-scope as the positive blank pulse.

The final output from the buffer stage 26 is fed to amplifier 32 which is biased at cutoff so that the video portion of the composite signal will not produce an output therefrom. However, the positive portion of the composite signal will be amplified. This amplified output is coupled to a low frequency filter 33 which eliminates the positive low frequency blank pulse portion of the signal and passes the PRF pulses on to the amplifier 34 which amplifies the remaining PRF pulses. The output from the amplifier 34 is applied to a buffer stage 35 which supplies the positive PRF pulses to the radar B-scope.

Now that the separate video, blank and PRF pulses are available from the previously recorded video tape data, the individual outputs are routed directly to radar B-scope display as shown, which they operate the same as live radar video presentation.

Obviously many modifications and variations of the present invention are possible in the light of the above teachings. It is therefore to be understood that, within the scope of the appended claims, the invention may be practiced otherwise than as specifically described.

I claim:

1. A radar composite video processor comprising, in combination:
  A. A record section including:
    1. a first, second and third stage for receiving video pulses, positive blank pulses and PRF pulses, respectively, from a radar receiver;
    2. a mixer network coupled to the outputs from each of said stages for combining the three pulses into a single, composite signal; and
    3. output amplifier means coupled to the mixer network for applying the composite signal to a magnetic tape recorder for recording said signal on a single channel thereof; and
  b. a playback section including:
    1. input amplifier means for receiving the recorded composite signal from the magnetic tape recorder and for producing three equal output signals;
    2. a first, second and third stage each receiving an output signal from said composite signal input means for separating the video pulses, positive blank pulses and PRF pulses, respectively, from said composite signal and for applying said separated pulses to an associated display scope of said radar receiver.

2. A radar composite video processor as recited in claim 1, wherein the second stage of the playback section also produces a negative blank pulse for application to said display scope.

3. A radar composite video processor as recited in claim 1, wherein:

a. the first stage of the record section includes a buffer amplifier for receiving said video pulses and for eliminating any interaction between the radar receiver and said first stage and a linear operating amplifier connected between the output of said buffer amplifier and the mixer network for coupling said video pulses thereto;
  b. the second stage of the record section includes an amplifier for receiving said positive blank pulses and for inverting the phase thereof, compensating means connected to the output of said last-mentioned amplifier for integrating said positive blank pulses to cause them to rise from their leading to their trailing edges thereby eliminating any droop caused by recording said pulses, a buffer amplifier connected to the output of said compensating means, and a linear operating amplifier connected between the output of said buffer amplifier and the mixer network for inverting the phase and coupling said positive blank pulse thereto; and
  c. the third stage of the record section includes a buffer amplifier for receiving said PRF pulses and coupling them to the mixer network.

4. A radar composite video processor as recited in claim 3, wherein the output amplifier means of the record section is a two-stage amplifier connected in a Darlington circuit configuration and wherein said buffer amplifiers are emitter-follower circuit configurations.

5. A radar composite video processor as recited in claim 1, wherein:
  a. the input amplifier means of the playback section is a buffer amplifier for eliminating any interaction between the magnetic tape recorder and the three stages of said playback section;
  b. the first stage of the playback section includes an amplifier for receiving said composite signal from said last-mentioned buffer amplifier, said amplifier is biased to amplify, invert the phase thereof and pass the video pulse of said composite signal only, and filter means connected between the output of said amplifier and the display scope for removing any level shifts in the video pulse caused by the positive blank pulse of the composite signal;
  c. the second stage of the playback section includes a first amplifier for receiving said composite signal from the input buffer amplifier and for inverting the phase thereof, filter means connected to the output of said amplifier for removing the video and PRF pulses present in the composite signal and for coupling the negative blank pulse produced thereby to the display scope, a second amplifier connected between the output of said filter means and the display scope for inverting the phase and coupling the positive blank pulse thereto; and
  d. the third stage of the playback section includes a first amplifier for receiving said composite signal from the input buffer amplifier, said first amplifier is biased to amplify and pass the positive blank and PRF pulse portions of said composite signal only, filter means connected to the output of said first amplifier for removing the positive blank pulse portion of said output signal, a second amplifier connected to the output from said filter means for amplifying the PRF pulses to their required level, and a buffer amplifier connected between the output from said second amplifier and the display scope for coupling the PRF pulse thereto.

6. A radar composite video processor as recited in claim 3, wherein:
  a. the input amplifier means of the playback section is a buffer amplifier for eliminating any interaction between the magnetic tape recorder and the three stages of said playback section;
  b. the first stage of the playback section includes an amplifier for receiving said composite signal from said last-mentioned buffer amplifier, said amplifier is biased to amplify, invert the phase thereof and pass the video pulse of said composite signal only, and filter means connected between the output of said amplifier and the display scope for removing any level shifts in the video pulse caused by the positive blank pulse of the composite signal;

c. the second stage of the playback section includes a first amplifier for receiving said composite signal from the input buffer amplifier and for inverting the phase thereof, filter means connected to the output of said amplifier for removing the video and PRF pulses present in the composite signal and for coupling the negative blank pulse produced thereby to the display scope, a second amplifier connected between the output of said filter means and the display scope for inverting the phase and coupling the positive blank pulse thereto; and d. the third stage of the playback section includes a first amplifier for receiving said composite signal from the input buffer amplifier, said first amplifier is biased to amplify and pass the positive blank and PRF pulse portions of said composite signal only, filter means connected to the output of said first amplifier for removing the positive blank pulse portion of said output signal, a second amplifier connected to the output from said filter means for amplifying the PRF pulses to their required level, and a buffer amplifier connected between the output from said second amplifier and the display scope for coupling the PRF pulse thereto.

7. A radar composite video processor as recited in claim 5, wherein the buffer amplifiers are emitter-follower circuit configurations.